(12) United States Patent
Navarro et al.

(10) Patent No.: US 11,146,954 B2
(45) Date of Patent: Oct. 12, 2021

(54) SYSTEM AND METHOD FOR ESTABLISHING A TRUSTED SESSION

(71) Applicant: The Toronto-Dominion Bank, Toronto (CA)

(72) Inventors: Miguel Navarro, Ewing, NJ (US); Levi Sutter, Westampton, NJ (US); Lino Catana, Medford, NJ (US); Jonathan Goodman, Somerdale, NJ (US); Mohamed Abbas, Jersey City (CA)

(73) Assignee: The Toronto-Dominion Bank, Toronto (CA)

( * ) Notice: Subject to any disclaimer, the term of this patent is extended or adjusted under 35 U.S.C. 154(b) by 125 days.

(21) Appl. No.: 16/595,950

(22) Filed: Oct. 8, 2019

(65) Prior Publication Data

US 2021/0105620 A1    Apr. 8, 2021

(51) Int. Cl.

| | |
|---|---|
| *H04L 29/06* | (2006.01) |
| *H04W 12/06* | (2021.01) |
| *H04L 29/12* | (2006.01) |
| *H04W 8/00* | (2009.01) |
| *H04W 12/104* | (2021.01) |
| *H04W 12/108* | (2021.01) |

(52) U.S. Cl.
CPC ......... *H04W 12/06* (2013.01); *H04L 61/1541* (2013.01); *H04W 8/005* (2013.01); *H04W 12/104* (2021.01); *H04W 12/108* (2021.01)

(58) Field of Classification Search
CPC . H04W 12/06; H04W 12/108; H04W 12/104; H04W 8/005; H04L 61/1541; H04L 63/08; G06F 21/31
See application file for complete search history.

(56) References Cited

U.S. PATENT DOCUMENTS

| | | | | |
|---|---|---|---|---|
| 6,157,648 | A  * | 12/2000 | Voit | ..................... H04L 12/1421 |
| | | | | 370/354 |
| 6,289,010 | B1 * | 9/2001 | Voit | ........................ H04L 12/14 |
| | | | | 370/352 |
| 6,347,339 | B1 * | 2/2002 | Morris | ................ H04L 43/0811 |
| | | | | 709/224 |
| 6,983,370 | B2 * | 1/2006 | Eaton | ...................... H04L 51/04 |
| | | | | 713/153 |
| 8,244,886 | B2 * | 8/2012 | Short | ..................... H04L 67/42 |
| | | | | 709/228 |
| 8,819,432 | B2 | 8/2014 | Bergsten et al. | |
| 8,971,850 | B2 | 3/2015 | Klein et al. | |

(Continued)

*Primary Examiner* — Hosuk Song
(74) *Attorney, Agent, or Firm* — Rowand LLP

(57) ABSTRACT

A method for establishing a trusted session between a first computing device and a computer server includes obtaining identifying information for the first computing device and a second computing device. The identifying information includes identifying information corresponding to the networks to which each of the computing devices are directly connected. Based on the identifying information it may be determined that there is sufficient correspondence between the first and second computing devices. If so, an indication is sent to the second computing device requesting confirmation that the first computing device should be authenticated to the account. An indication confirming this may then be received and, responsive thereto, the first computing device is authenticated to the account. Related computer systems and computer-readable media are also disclosed.

18 Claims, 5 Drawing Sheets

(56) References Cited

U.S. PATENT DOCUMENTS

| | | |
|---|---|---|
| 9,275,228 B2 | 3/2016 | Niemela et al. |
| 9,351,193 B2 * | 5/2016 | Raleigh .................. G06Q 40/00 |
| 9,407,619 B2 | 8/2016 | Tunnell et al. |
| 9,912,648 B2 | 3/2018 | Taylor, III et al. |
| 10,924,921 B2 * | 2/2021 | Jin ........................ H04W 12/43 |
| 2008/0104410 A1 | 5/2008 | Brown et al. |
| 2014/0250518 A1 | 9/2014 | Schneider |
| 2018/0130056 A1 | 5/2018 | Smales |
| 2018/0288026 A1 | 10/2018 | Callaghan |
| 2019/0034612 A1 | 1/2019 | Smales |

* cited by examiner

SYSTEM AND METHOD FOR ESTABLISHING A TRUSTED SESSION

FIELD

This relates to authorization and authentication, and, more particularly, to establishing trusted sessions between computer systems.

BACKGROUND

Users may use a multitude of computing devices to interact with remote computing devices which may, for example, provide one or more services. For example, a user may use a personal computer and a smart phone to access the same service. Such access by the devices may require a trusted session to be established between each of those user devices and a remote computer system providing the service. Typically, this requires the user to go through required authentication steps on each of their devices to establish trusted session(s) between those devices and the remote computer system.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
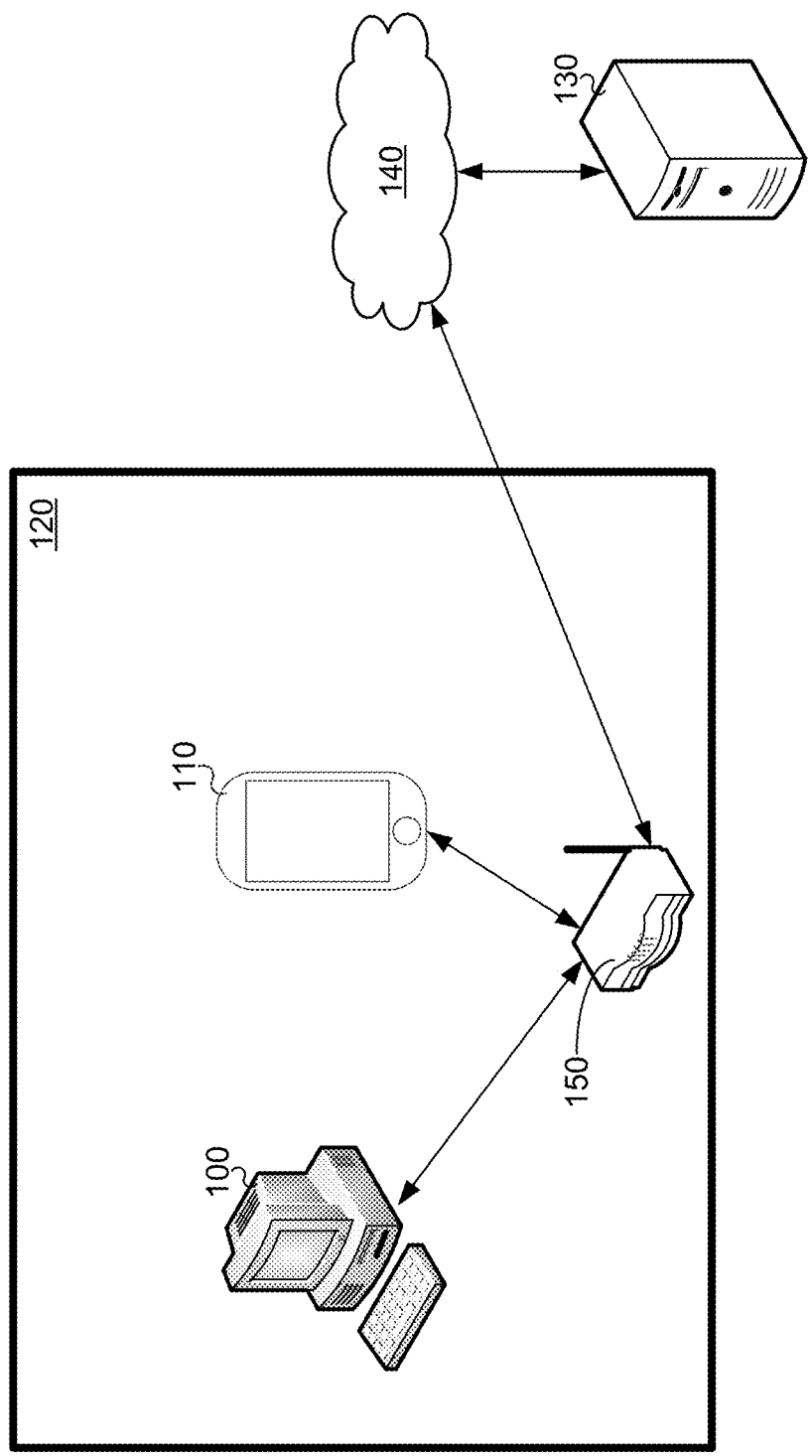
FIG. 1 is a schematic operation diagram illustrating an operating environment of an example embodiment.
Figure 2:
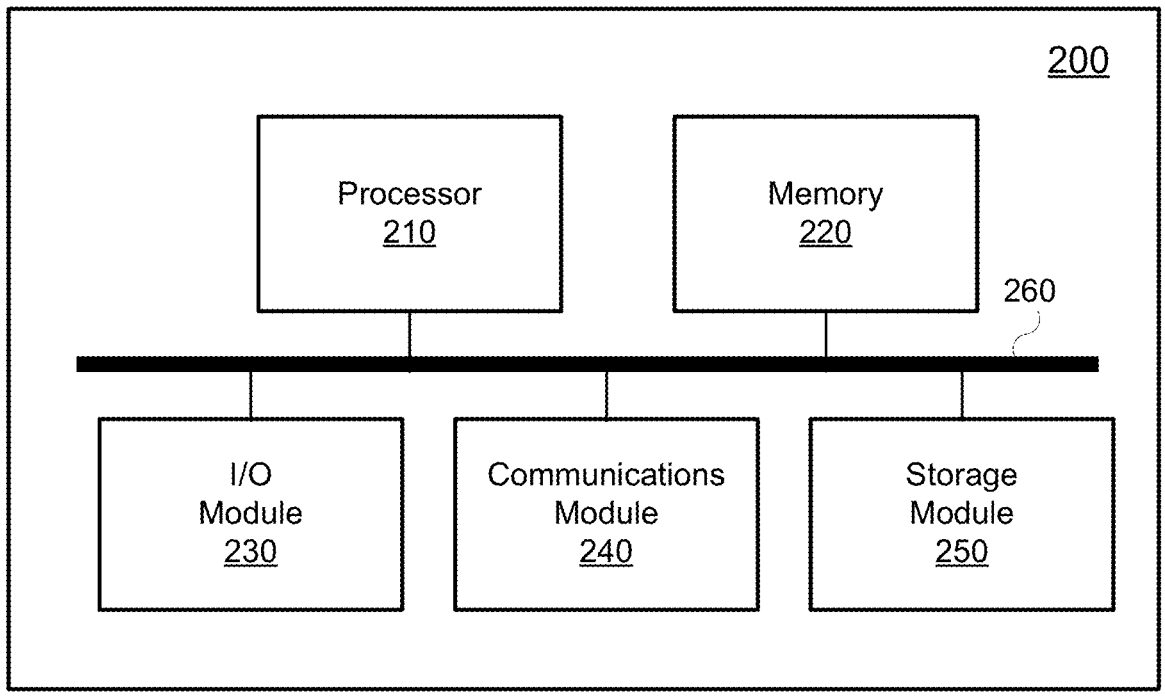
FIG. 2 depicts a high-level operation diagram of an example computing device.

According to the subject matter of the present application, there may be provided a computer system. The computer system may include a processor, a communications module, and a memory module. The communications module and the memory module may be coupled to the processor. The memory module may store instructions that, when executed by the processor, cause the computer system to: receive, using the communications module from a first computing device via an internetwork, a request to authenticate to an account using a second computing device; obtain first identifying information for the first computing device. The first identifying information may include first network identifying information corresponding to a first network of the internetwork to which the first computing device is directly connected. The instructions, when executed by the processor may further cause the computer system to: obtain second identifying information for the second computing device. The second identifying information may include second network identifying information corresponding to a second network of the internetwork to which the second computing device is directly connected. The instructions, when executed by the processor may further cause the computer system to: determine based on the first and second identifying information that there is sufficient correspondence between the first and second computing devices; responsive to determining that there is sufficient correspondence between the first and second computing devices, send, using the communications module via the internetwork, an indication to the second computing device requesting confirmation that the first computing device should be authenticated to the account; receive, using the communications module via the internetwork, an indication confirming that the first computing device should be authenticated to the account; and responsive to the indication, authenticate the first computing device to the account.

Conveniently, in this way, a computing device may establish a trusted relationship with a server by leveraging an existing trusted relationship between a second computing device and that server.

In some implementations, the first identifying information may include multiple items for which there are corresponding items in the second identifying information. It may be that confirming based on the first and second identifying information that there is sufficient correspondence between the first and second computing devices includes determining that there is a correspondence between at least a threshold number of the corresponding items.

In some implementations, determining that there is a correspondence between at least a threshold number of the corresponding items may include determining that there is a correspondence between all of the corresponding items.

In some implementations, the corresponding items may include at least two of geolocations of the first and second computing devices, gateway servers associated with the first and second networks, network addresses associated with the first and second computing devices and service set identifiers of the first and second network.

In some implementations, the first network may be or may include a wireless network and the first network identifying information may include a service set identifier (SSID) of the first network. Additionally, it may be that the second network is or includes a wireless network and that the second network identifying information includes an SSID of the second network. Determining that there is sufficient correspondence between the first and second computing devices may include determining that the SSID of the first network is the same as the SSID of the second network.

In some implementations, the first network identifying information may include an address of a first gateway server through which nodes on the first network access the internetwork. Additionally, it may be that the second network identifying information includes an address of a second gateway server through which nodes on the second network access the internetwork. Determining that there is sufficient correspondence between the first and second computing devices may include determining based on the addresses that the first gateway server is the same as the second gateway server.

In some implementations, the first identifying information may include a first geolocation corresponding to a physical location of the first computing device. Additionally, it may be that the second identifying information includes a second geolocation corresponding to a physical location of the second computing device. Determining that there is sufficient correspondence between the first and second computing devices may include determining that the first geolocation is within a defined proximity to the second geolocation.

In some implementations, the first identifying information may include a first Internet Protocol (IP) address associated with the first computing device on the first network. Additionally, it may be that the second identifying information includes a second IP address associated with the second computing device on the second network. Determining that there is sufficient correspondence between the first and second computing devices may include determining that the first IP address and the second IP address are on the same subnet.

In some implementations, it may be that the instructions, when executed by the processor, further cause the computer system to: responsive to determining that there is sufficient correspondence between the first and second computing devices and prior to sending the indication to the second computing device requesting confirmation that the first computing device should be authenticated to the account, generate a code. The indication to the second computing device requesting confirmation that the first computing device should be authenticated to the account may include the code for presentation by the second computing device. The indication confirming that the first computing device should be authenticated to the account may be received from the first computing device and may include a value purported to be the code. The first computing device may be authenticated to the account responsive to determining that the value purported to be the code matches the code.

In some implementations, the first computing device may be a smart speaker.

According to the subject matter of the present application, there may be provided a computer-implemented method. The method may include: receiving, from a first computing device via an internetwork, a request to authenticate to an account using a second computing device; obtaining first identifying information for the first computing device. The first identifying information may include first network identifying information corresponding to a first network of the internetwork to which the first computing device is directly connected. The method may further include: obtaining second identifying information for the second computing device. The second identifying information may include second network identifying information corresponding to a second network of the internetwork to which the second computing device is directly connected. The method may further include: determining based on the first and second identifying information that there is sufficient correspondence between the first and second computing devices; responsive to determining that there is sufficient correspondence between the first and second computing devices, sending, via the internetwork, an indication to the second computing device requesting confirmation that the first computing device should be authenticated to the account; receiving, via the internetwork, an indication confirming that the first computing device should be authenticated to the account; and responsive to the indication, authenticating the first computing device to the account.

In some implementations, the first identifying information may include multiple items for which there are corresponding items in the second identifying information. It may be that confirming based on the first and second identifying information that there is sufficient correspondence between the first and second computing devices includes determining that there is a correspondence between at least a threshold number of the corresponding items.

In some implementations, determining that there is a correspondence between at least a threshold number of the corresponding items may include determining that there is a correspondence between all of the corresponding items.

In some implementations, the corresponding items may include at least two of geolocations of the first and second computing devices, gateway servers associated with the first and second networks, network addresses associated with the first and second computing devices and service set identifiers of the first and second network.

In some implementations, the first network may be or may include a wireless network and the first network identifying information may include a service set identifier (SSID) of the first network. Additionally, it may be that the second network is or includes a wireless network and that the second network identifying information includes an SSID of the second network. Determining that there is sufficient correspondence between the first and second computing devices may include determining that the SSID of the first network is the same as the SSID of the second network.

In some implementations, the first network identifying information may include an address of a first gateway server through which nodes on the first network access the internetwork. Additionally, it may be that the second network identifying information includes an address of a second gateway server through which nodes on the second network access the internetwork. Determining that there is sufficient correspondence between the first and second computing devices may include determining based on the addresses that the first gateway server is the same as the second gateway server.

In some implementations, the first identifying information may include a first geolocation corresponding to a physical location of the first computing device. Additionally, it may be that the second identifying information includes a second geolocation corresponding to a physical location of the second computing device. Determining that there is sufficient correspondence between the first and second computing devices may include determining that the first geolocation is within a defined proximity to the second geolocation.

In some implementations, the first identifying information may include a first Internet Protocol (IP) address associated with the first computing device on the first network. Additionally, it may be that the second identifying information includes a second IP address associated with the second computing device on the second network. Determining that there is sufficient correspondence between the first and second computing devices may include determining that the first IP address and the second IP address are on the same subnet.

In some implementations, the method may further include: responsive to determining that there is sufficient correspondence between the first and second computing devices and prior to sending the indication to the second computing device requesting confirmation that the first computing device should be authenticated to the account, generating a code. The indication to the second computing device requesting confirmation that the first computing device should be authenticated to the account may include the code for presentation by the second computing device. The indication confirming that the first computing device should be authenticated to the account may be received from the first computing device and may include a value purported to be the code. The first computing device may be authenticated to the account responsive to determining that the value purported to be the code matches the code.

According to the subject matter of the present application, there may be provided a computer-readable medium. The computer-readable medium may be a non-transitory computer-readable storage medium. The computer-readable medium may store instructions that, when executed by a processor of a computer system, cause the computer system to perform the above-described method.

According to the subject matter of the present application, there may be provided a computer-readable medium. The computer-readable medium may be a non-transitory computer-readable storage medium. The computer-readable medium may store instructions that, when executed by a processor of a computer system, cause the computer system to: receive, from a first computing device via an internetwork, a request to authenticate to an account using a second computing device; obtain first identifying information for the first computing device. The first identifying information may include first network identifying information corresponding to a first network of the internetwork to which the first computing device is directly connected. The instructions, when executed, may further cause the computer system to: obtain second identifying information for the second computing device. The second identifying information may include second network identifying information corresponding to a second network of the internetwork to which the second computing device is directly connected. The instructions, when executed, may further cause the computer system to: determine based on the first and second identifying information that there is sufficient correspondence between the first and second computing devices; responsive to determining that there is sufficient correspondence between the first and second computing devices, send, via the internetwork, an indication to the second computing device requesting confirmation that the first computing device should be authenticated to the account; receive, via the internetwork, an indication confirming that the first computing device should be authenticated to the account; and responsive to the indication, authenticate the first computing device to the account.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a first computing device 100 and a second computing device 110 are disposed in or about an environment 120. The first computing device 100 and the second computing device 110 may be physically proximate.

A server computer system 130 may provide one or more services to either or both of the first computing device 100 and the second computing device 110. In particular, the server computer system 130 may communicate with the first computing device 100 and/or the second computing device 110 and the first computing device 100 and the second computing device 110 may communicate with the server computer system 130, in each case via an internetwork 140.

Notably, each of the first computing device 100 and the second computing device 110 may communicate with the internetwork 140 via common network infrastructure such as, for example, one or more of a common gateway, a wireless network, a router, a cable modem, a digital subscriber line (DSL) modem, an optical network terminal (ONT), and/or the like. For example, the first computing device 100 and the second computing device 110 may communicate with the internetwork 140 via a wireless router 150 as shown.

As illustrated, the first computing device 100 is a personal computer and the second computing device 110 is a smartphone. However, this is by way of example. In some implementations, one or both of the first computing device 100 and the second computing device 110 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), and any other type of computing device that may be configured to store data and software instructions, and execute software instructions to perform operations consistent with disclosed embodiments.

The server computer system 130 is a computing device that provides services to one or more client devices including, for example, one or both of the first computing device 100 and the second computing device 110. The server computer system 130 may, for example, be a mainframe computer, a minicomputer, or the like. In some implementations, the server computer system 130 may be formed of or may include one or more computing devices. The server computer system 130 may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some implementations, the server computer system 130 may include multiple computing devices organized in a tiered arrangement. For example, the server computer system 130 may include middle-tier and back-end computing devices. In some implementations, the server computer system 130 may be a cluster formed of a plurality of interoperating computing devices.

The internetwork 140 is a computer network and, more particularly an internetwork such as may be formed of one or more interconnected computer networks. For example, the internetwork 140 may be or may include an Ethernet network, an asynchronous transfer mode (ATM) network, a wireless network, the like, and/or more than one of any or all of the foregoing. Notably, the internetwork 140 may utilize the Transmission Control Protocol/Internet Protocol. Put another way, the internetwork 140 may be a TCP/IP network. In a particular example, the internetwork 140 may be the Internet.

The wireless router 150 may, as illustrated, be a Wi-Fi™/ 802.11x router. In a particular example, the environment 120 may correspond to a home or small business. The wireless router 150 may provide wireless access for the environment 120 including to access the internetwork 140. For example, it may be that the internetwork 140 is the Internet and the wireless router 150 provides Internet access to authorized computing devices in the environment 120 such as, for example, computing devices such as may belong to a family or business associated with the environment 120. As such, the wireless router 150 may act as a gateway to the internetwork 140. Additionally or alternatively, the wireless router 150 may provide or be a component of a wireless network (WLAN) such as may include the first computing device 100 and the second computing device 110. In some cases, the wireless router 150 may provide one or more services related to acting as a gateway to the internetwork 140 and/or to support the WLAN. For example, the wireless router 150 may act as a firewall, perform network address translation between addresses of the WLAN and one or more addresses of the internetwork 140, and/or may be responsible for providing one or more other services such as for example, the assignment of network addresses on the WLAN (e.g., by acting as a Dynamic Host Configuration Protocol (DHCP) server) and/or naming-related services (e.g., by acting as a Domain Name System (DNS) server).

The server computer system 130 may have an existing trust relationship with the second computing device 110. More specifically, the second computing device 110 may trust the server computer system 130 and/or the server computer system 130 may trust the second computing device 110. There may be a trust relationship between the server computer system 130 and the second computing device 110 because the second computing device 110 has authenticated to/with server computer system 130 in order to use a service provided by the server computer system 130 (e.g., such that a trusted session already exists between the second computing device 110 and server computer system 130). Additionally or alternatively, it may be that an account links the second computing device 110 and the server computer system 130 and that the server computer system 130 trusts the second computing device 110 because it has authenticated with the server computer system 130 using that account. In a particular example, there may be a trust relationship between the server computer system 130 and the second computing device 110 because the second computing device 110 has authenticated to/with the server computer system 130 using an account in order to establish a trusted session and/or to use/as a part of using a service provided by the server computer system 130.

Figure 3:
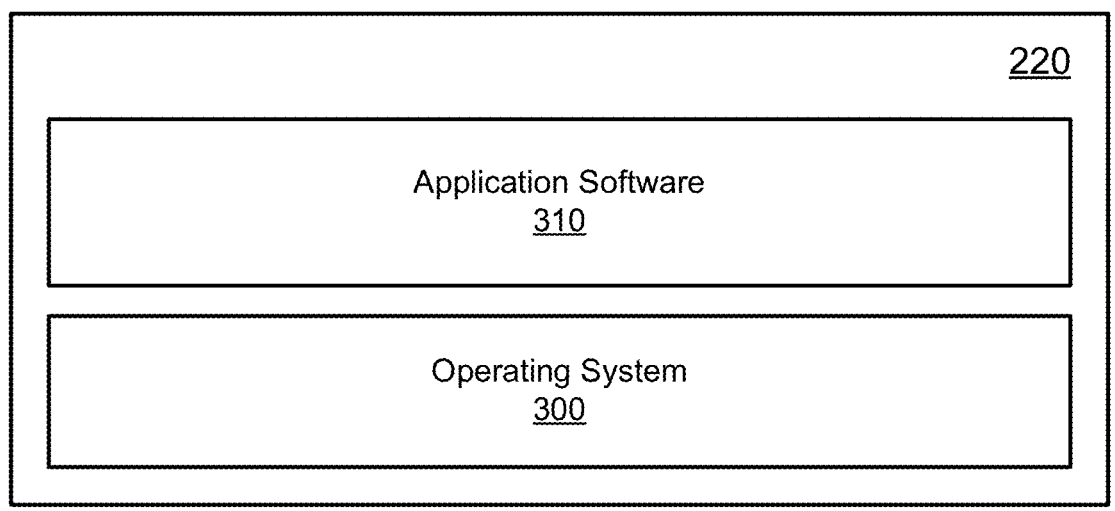
FIG. 3 depicts a simplified software organization exemplary of the example computing device of FIG. 2.

Components of an example computing device 200 will now be discussed with regard to FIG. 3. In some embodiments, one or more instances of the example computing device 200 may serve as the first computing device 100, the second computer device 110 and/or the server computer system 130.

The example computing device 200 includes a variety of modules. For example, as illustrated, the example computing device 200 may include a processor 210, a memory 220, an I/O module 230, a communications module 240, and/or a storage module 250. As illustrated, the foregoing example modules of the example computing device 200 are in communication over a bus 260.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The I/O module 230 is an input module and an output module. As an input module, the I/O module 230 allows the example computing device 200 to receive input from components of the example computing device 200. In some embodiments such as, for example, potentially where the example computing device 200 corresponds to the second computing device 110, the I/O module 230 may allow the second computing device 110 to provide output to one or more output devices and/or receive input from one or more input devices. For example, in some such embodiments, the I/O module 230 may be used in providing output via a display of the second computing device 110 and/or in receiving input therefrom (e.g., if the display is a touchscreen). In another example, in some embodiments, such as, for example, potentially where the example computing device 200 corresponds to the first computing device 100, the I/O module 230 may allow the first computing device 100 to provide output via one or more output devices such as, for example, via a screen of the first computing device 100 and/or to receive input from one or more input devices such as, for example, from a keyboard and/or a pointing device (e.g., a mouse, trackball, trackpad, or the like).

The communications module 240 allows the example computing device 200 to communicate with other computing devices and/or various communications networks, such as, for example, the internetwork 140. The communications module 240 may allow the example computing device 200 to send or receive communications signals. Communications signals may be sent or received according to one or more protocols or according to one or more standards. For example, the communications module 240 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the example computing device 200 to communicate via Wi-Fi™, using Bluetooth™ or via some combination of one or more networks or protocols. Notably, where the example computing device 200 corresponds to the first computing device 100 or the second computing device 110, the communications module may be employed to communicate with the wireless router 150. In some implementations, all or a portion of the communications module 240 may be integrated into a component of the example computing device 200. For example, the communications module 240 may be integrated into a communications chipset.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 240. In some embodiments, the storage module 250 may be omitted and its function may be performed by the memory 220 and/or by the processor 210 in concert with the communications module 240 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 4:
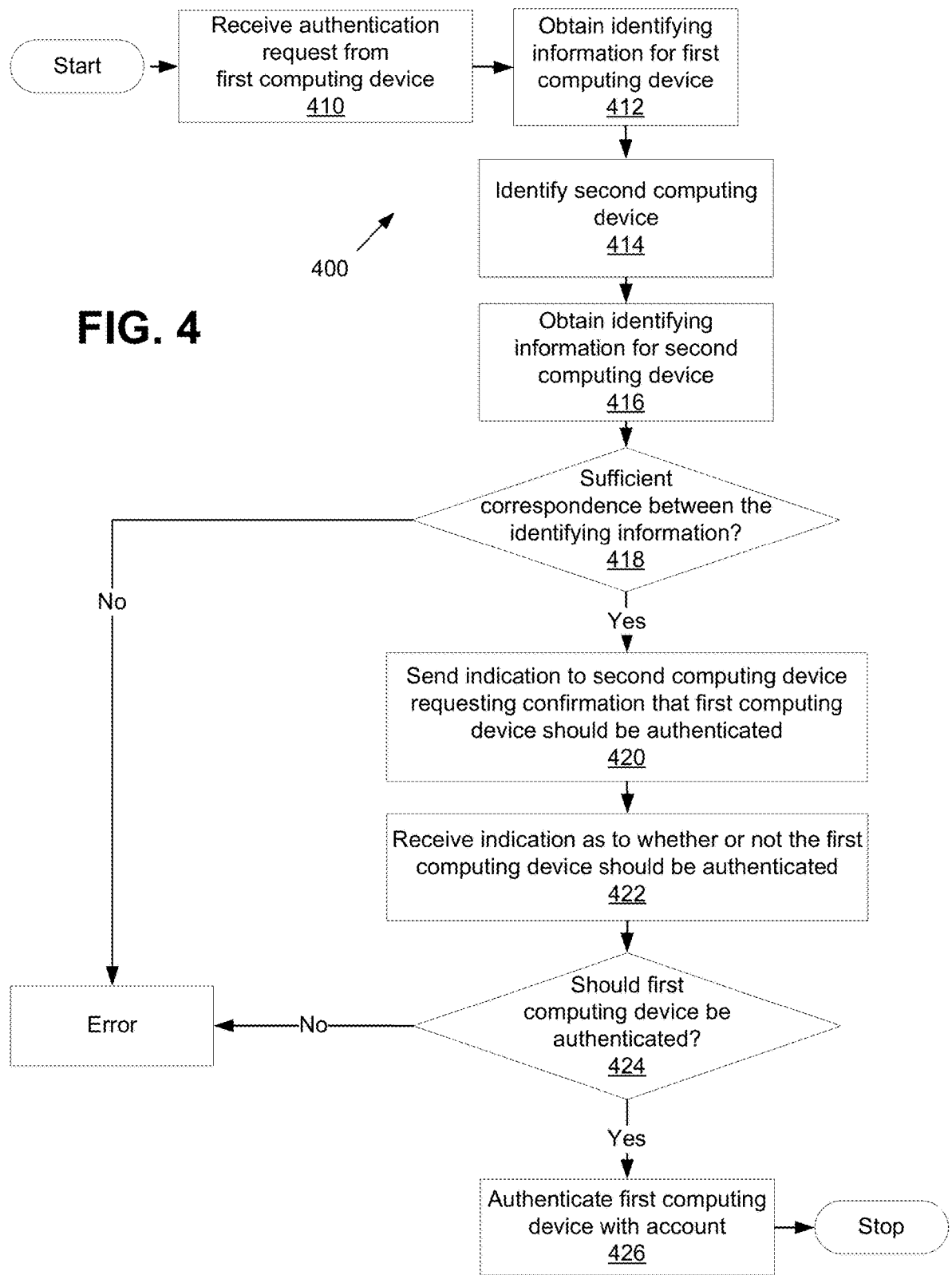
FIG. 4 is a flowchart depicting example operations performed by a computer server system in establishing a trusted session with a computing device.

FIG. 4 depicts a simplified organization of software components stored in the memory 220 of the example computing device 200. As illustrated, these software components include an operating system 300 and an application software 310.

The operating system 300 is software. The operating system 300 allows the application software 310 to access the processor 210, the memory 220, the I/O module 230, the communications module 240, and the storage module 250 of the example computing device 200. The operating system 300 may be, for example, Google™ Android™, Apple™ iOS™, UNIX™, Linux™, Microsoft™ Windows™, Apple OSX™ or the like.

Where one or more instances of example computing device 200 correspond to one or more of the first computing device 100, the second computing device 110, and/or the server computer system 130, the application software 310 may adapt the example computing device 200 to perform one or more associated functions. For example, the application software 310 may adapt instances of the example computing device 200 to co-operate in the establishment of a trust relationship between the first computing device 100 and the server computer system 130. Notably, where the example computing device 200 is or corresponds to a mobile device such as, for example, a smartphone or tablet (e.g., where a given instance of the example computing device 200 corresponds to the second computing device 110), the application software 310 may itself be or may be a part of a smartphone or tablet application or "app". In a particular example, the application software 310 may correspond to an online banking and/or personal finance app.

By way of overview, the subject matter of the present application may allow a trust relationship to be established between an electronic device such as, for example, the first computing device 100 and a remote computer server system such as, for example, the server computer system 130 with the aid of the second computing device 110. For example, the first computing device 100 may, according to the subject matter of the present application, authenticate to an account associated with the server computer system 130 using the second computing device 110.

Example manners of establishing a trust relationship will now be discussed with reference to FIG. 4. Operations performed by the server computer system 130 in establishing a trusted session between the first computing device 100 and the server computer system 130 are summarized in the flowchart of FIG. 4 which illustrates a method 400 for establishing trusted sessions. In performing the method 400, operations starting from an operation 410 and continuing onward are performed by a processor of server computer system 130 executing software. For example, where the server computer system 130 is or includes at least one instance of the example computing device 200, the operations may be performed by the processor 210 executing instructions of a suitable instance of the application software 310.

At the operation 410, the server computer system 130 receives an authentication request from the first computing device 100 via the internetwork 140. The request may be received using a communications module. For example, where the server computer system 130 is an instance of the example computing device 200, the request may be received using the communications module 240.

As further described below, the received request is a request to authenticate to an account with the aid of a proximate computing device that is already authenticated to/has an already-established trusted session with the server computer system 130. An example of such a proximate device may, as noted above, be the second computing device 110. In some implementations, the request may identify the second computing device 110 specifically. Additionally or alternatively, there may be a previously established relationship between the first computing device 100 and the second computing device 110 (e.g., that they are both associated with a common profile and/or account such as, for example, a profile and/or account associated with the server computer system 130) that serves to identify the second computing device 110. Additionally or alternatively, the second computing device 110 may be identified by the server computer system 130 to aid in the handling of the request in manners further described below.

The request may arise in a variety of manners.

Figure 5:
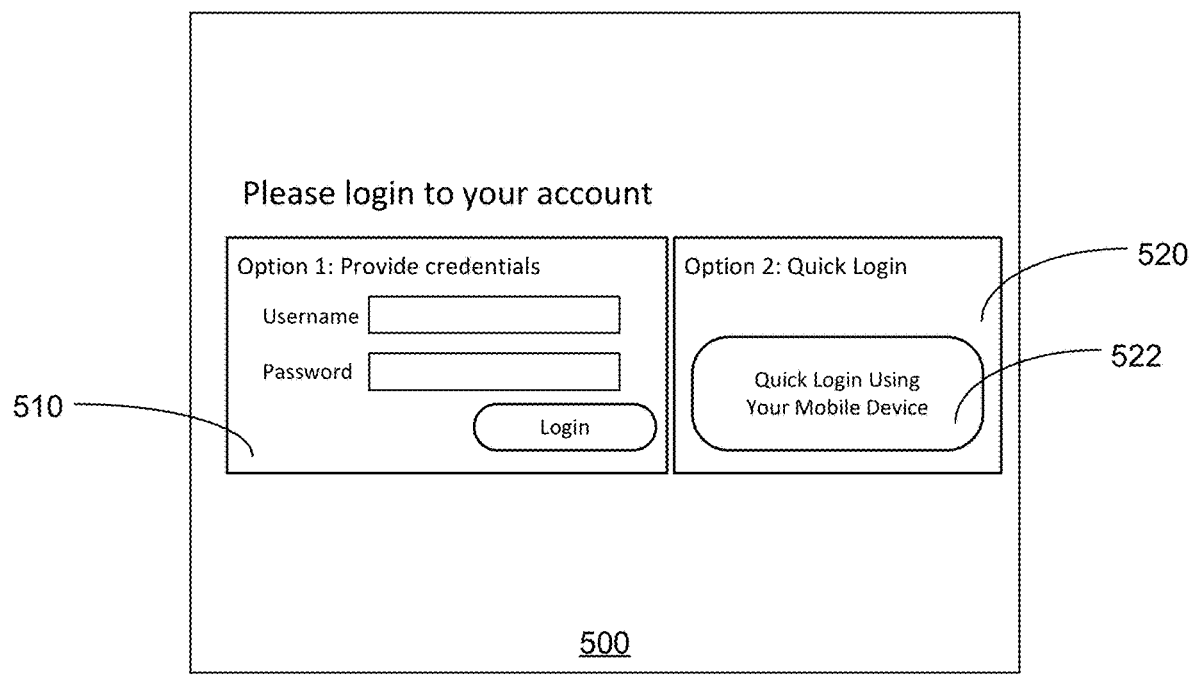
FIG. 5 shows an example user interface as may be employed to initiate the establishment of a trusted session.

For example, it may be that input is received at the first computing device 100 selecting an option to quickly login using a user's mobile device which may correspond to the second computing device 110. In a particular example, it may be that an option is presented at the first computing device 100 (e.g., via a suitable graphical user interface) allowing quick login as an alternative to a conventional (e.g., username and password) authentication method. An example user interface 500 such as may be employed in initiating establishment of a trusted session according to the method 400 is shown in FIG. 5.

As illustrated, the example user interface 500 includes user interface controls allowing a user to choose between a conventional username and password login and a quick login. In particular, a first area 510 of the example user interface 500 includes user interface controls for performing a conventional password-based login and a second area 520 of the example user interface 500 includes a button 522 that, when selected, may trigger the start of the establishment of a trusted session according to the method 400. For example, it may be that the first computing device 100 sends the request received by the server computer system 130 at the operation 410 to the server computer system 130 via the internetwork 140 responsive to receiving input selecting the button 522. In a particular example, where the first computing device 100 is an instance of the example computing device 200, the first computing device 100 may send such a request using the communications module 240 responsive to receiving input (e.g., from a pointing device clicking on the button 522) such as may, for example, be received via the I/O module 230.

Notably, where the request sent by the first computing device 100 identifies the second computing device 110 specifically, it may be that a user interface provided for initiating the quick login process includes one or more user interface elements (not shown) such as may be used to identify the second computing device 110 (e.g., by selecting it from a list and/or by providing one or more identifying parameters (e.g., an address and/or a hardware address) thereof. In a particular example, the user interface may allow an IP address and/or an International Mobile Identity (IMEI) number associated with the second computing device 110 to be provided. Whatever its form, such information may, in some implementations, be included in the aforementioned request received by the server computer system 130 from the first computing device 100.

Returning to consideration of FIG. 4, following receipt of the request at the operation 410, an operation 412 is next.

By way of overview, the server computer system 130 may only allow the first computing device 100 to establish a trusted session with the first computing device 100 using the second computing device 110 (or any other device) if the first computing device 100 and the other device are both proximate each other. For example, this may correspond to determining that the first computing device 100 and second computing device 110 are both in and/or proximate to the environment 120. That such a condition has been satisfied may be determined based on an evaluation of identifying information for each of the first computing device 100 and the second computing device 110.

At the operation 412, identifying information for the first computing device 100 is obtained by the server computer system 130. In some implementations, some or all of this identifying information may have already been received from the first computing device 100 such as, for example, as a part of the request received at the operation 410. Accordingly, it may be that the operation 412 corresponds, for example, to extraction of the identifying information from that request. Additionally or alternatively, some or all of the identifying information for the first computing device 100 may be requested and received from the first computing device 100 such as, for example, over the internetwork 140. Additionally or alternatively, some or all of the identifying information for the first computing device 100 may be requested and received from another remote computing device. In a particular example, some or all of the identifying information for the first computing device 100 may be received from the wireless router 150.

However received, the identifying information for the first computing device 100 may take a variety of forms.

For example, the identifying information may include network identifying information corresponding to the network to which the first computing device 100 is directly connected and via which the first computing device 100 accesses the internetwork 140. This network is hereinafter referred to as the "first network".

Network identifying information may take a variety of forms. For example, network identifying information may include the address of a gateway server associated with the first network. Additionally or alternatively, network identifying information may include a network address associated with the first computing device 100 on the first network (e.g., an Internet Protocol (IP) address of the first computing device 100). Additionally or alternatively, network identifying information may include a service set identifier (SSID) of the first network if the first network is or includes a wireless network such as, for example, if it is (or includes) an 802.11x network such as, may for example, be provided by the wireless router 150.

As another example, the identifying information of the first computing device 100 may include a geolocation of the first computing device 100. Such a geolocation may be determined in a variety of manners. For example, the first computing device 100 may include or may interact with a receiver for one or more of satellite-based location systems, such as, for example, global positioning satellite (GPS), GLONASS, BeiDou Navigation Satellite System (BDS), and/or Galileo in order to locate the first computing device 100. Additionally or alternatively, the first computing device 100 may employ other techniques/technologies for geographic location determination such as, for example, cell-tower triangulation and/or the use of wireless (e.g., Wi-Fi) hotspot location data. In another example, a geographic location may be determined using cell-tower triangulation.

The above example identifying information is provided by way of example only and other identifying information is contemplated and may, additionally or alternatively, be obtained for the first computing device 100. Broadly speaking, identifying information for the first computing device 100 obtained at the operation 412 may include information identifying and/or otherwise characteristic of the first computing device 100 and/or the first network.

Following the operation 412, an operation 414 is next.

At the operation 414, an already-logged in computing device corresponding to the first computing device 100 (e.g., the second computing device 110) is identified. Put another way, a computing device that is already authenticated with the server computer system 130 and associated with the relevant account is identified. Such a computing device may be identified in a variety of manners.

In some implementations, as mentioned above, an already-logged in computing device (e.g., the second computing device 110) may be specified in the authentication request received at the operation 410. In such implementations, the identification of the already-logged in computer device (e.g., the operation 414) may correspond to verifying that the specified computing device is indeed already logged in (as otherwise an error has occurred).

In some implementations, the identification of the already-logged in computing device may be user-initiated. For example, a user may somehow provide an indication to the server computer system 130 that a particular computing device should be used in completing a "quick login". In a particular example, a user may launch an application ("app") on the second computing device 110 and this may cause the second computing device 110 to send an indication to the server computer system 130 (e.g., via the internetwork 140) identifying the second computing device 110 as the second device.

In some implementations, the server computer system 130 may identify the already-logged computing device based on information available at the server computer system 130. For example, the server computer system 130 may maintain information (e.g., in storage accessed such as may, for example, be accessed via the storage module 250 where the server computer system 130 is an instance of the example computing device 200) regarding logged-in computing devices associated with a particular account and may match (e.g., based on the authentication request) with a computing device (e.g., the second computing device 110) based on the maintained information.

However identified, following identification of the already logged-in computing device at the operation 414, an operation 416 is next.

At the operation 416, identifying information for the computing device identified at the operation 414 (e.g., the second computing device 110) is obtained. By way of example only and for the general sake of clarity, the following explanation assumes that the computing device identified at the operation 414 is the second computing device 110.

The identifying information for the second computing device 110 may be obtained in a variety of manners consistent with the obtaining of the identifying information for the first computing device 100 at the operation 412.

For example, the identifying information for the second computing device 110 may include network identifying information corresponding to the network to which the second computing device 110 is directly connected and via which the second computing device 110 accesses the internetwork 140. This network is hereinafter referred to as the "second network". Network identifying information for the second network may include network identifying information analogous to that discussed above in relation to the first network.

As another example, the identifying information of the second computing device 110 may include a geolocation of the second computing device 110 such as may, for example, be determined in manners consistent with those discussed above in relation to determination of a geolocation of the first computing device 100.

More broadly, other identifying information for the second computing device 110 may be obtained. Indeed, as with the identifying information for the first computing device 100, the above example identifying information is provided by way of example only and other identifying information is contemplated and may, additionally or alternatively, be obtained for the second computing device 110. As with the identifying information for the first computing device 100, the identifying information obtained for the second computing device 110 may, broadly speaking, include information identifying and/or otherwise characteristic of the second computing device 110 and/or the second network.

Notably too, in some cases, the identifying information for the second computing device 110 may include categories of identifying information not included in the identifying information for the first computing device 100 obtained at the operation 412 and vice-versa.

Following the obtaining of identifying information for the second computing device 110 at the operation 416, an operation 418 is next.

At the operation 418, the server computer system 130 analyzes the identifying information obtained for the first computing device 100 and identifying information obtained for the second computing device 110 (i.e., as obtained at the operation 412 and the operation 416, respectively), to determine whether the second computing device 110 and the second computing device 110 are both proximate the environment 120. Put another way, the identifying information is compared to determine whether the second computing device 110 is sufficiently proximate the first computing device 100 that the second computing device 110 will be allowed to be utilized in establishing a trusted session between the first computing device 100 and the server computer system 130 and/or in authenticating the first computing device 100 to the server computer system 130. In particular, to determine whether or not the first computing device 100 and the second computing device 110 are sufficiently proximate, the server computer system 130 compares the identifying information for the first computing device 100 with the identifying information for the second computing device 110 to determine whether there is a sufficient correspondence between the first computing device 100 and the second computing device 110.

Items in the first identifying information and the second identifying information may be considered corresponding where they provide the same type of information about the first computing device 100 and the second computing device 110, respectively. As mentioned above, each of the identifying information for the first computing device 100 (hereinafter referred to as "first identifying information") and the identifying information for the second computing device 110 (hereinafter referred to as "second identifying information") may include categories of identifying information that are both are and are not included in other. Put another way, while the first identifying information may include items for which there are corresponding items in the second identifying information, it may also include items for which there are no such corresponding items in the second identifying information and vice-versa.

If there are not a sufficient number of corresponding items between the first and second identifying information, then the server computer system 130 may determine that there is not a sufficient correspondence between the first and second identifying information and thus between first computing device 100 and the second computing device 110. For example, a determination that there is a sufficient correspondence between the first computing device 100 and the second computing device 110 may require (e.g., as a prerequisite) that the number of corresponding items exceeds some threshold. If, however, there are indeed corresponding items (and, if required, that the number of such items exceeds a threshold number), the data associated with some or all of those corresponding items may be compared to determine whether there is sufficient correspondence between that data. For example, it may be that there is considered to be a sufficient correspondence between the first and second computing devices if there are multiple items (potentially having a cardinality more than a threshold, as discussed) in the first identifying data for which there are corresponding items in the second identifying data and there is a correspondence between the data associated with a sufficient number of those items. Put another way, it may be determined whether there is a correspondence between a sufficient number of the corresponding items (i.e., based on the data associated with those items). For example, sufficient correspondence between the first computing device 100 and the second computing device 110 may be considered to exist if there is correspondence between at least a threshold number of the corresponding items—i.e., the number of corresponding items with corresponding data exceeds a (second) threshold number. In a particular example, to find a sufficient correspondence between the first computing device 100 and the first computing device 100 may require determining that there is correspondence between all of the corresponding items of the first and second identifying information.

Correspondence between corresponding items may be determined in a variety of manners depending, for example, on the nature of the corresponding items, the data they include, and/or what they and that data represent. Examples of correspondence will now be discussed with regards to various example pieces of identifying information.

As a first example, if the first identifying information includes identifying information for the first network as discussed above (i.e., for the network to which the first computing device 100 is directly connected, hereinafter "first network identifying information") and the second identifying information includes identifying information for the second network as discussed above (i.e., for the network to which the first computing device 100 is directly connected, hereinafter "second network identifying information") corresponding items of network identifying information may be compared.

For example, if the first network identifying information includes an address of a first gateway server through which nodes on the first network access the internetwork 140 and the second network identifying information similarly includes an address of a second gateway server through which nodes on the second network access the internetwork 140, sufficient correspondence between the gateway servers may be found if the addresses thereof match (i.e., if the first gateway server is the same as the second gateway server). Notably, such a match may be expected if the first network and the second network are the same and/or closely connected in terms of the network topography. For example, such a match would be expected if the first computing device 100 and the second computing device 110 are both directly connected to a network associated with/provided by the wireless router 150. Indeed, it may be that the wireless router 150 (or some other computing device associated therewith) serves as the gateway for such a network as discussed above.

In another example of comparing items of network identifying information, if the first identifying information includes an address associated with the first computing device on the first network and the second identifying information includes an address associated with the second computing device on the second network, then those addresses may be compared to see if they correspond to the same logical network and/or have a close correspondence in terms of network topography. For example, where the addresses are both IP addresses, they may be considered to correspond if they share a common prefix and/or are on the same subnet.

In another example of comparing items of network identifying information, where both the first network and the second network are wireless networks (e.g., where the first computing device 100 and the second computing device 110 are both connected to WLANs), the corresponding items of the first identifying information and the second identifying information may include service set identifier (SSIDs) of the first network and the second network, respectively. Where the corresponding items include such a pair of SSIDs, determining that there is sufficient correspondence between the first and second computing devices may include determining that the first SSID is the same as the second SSID (i.e., that the service set identifiers of the first and second network match).

Beyond network identifying information, other corresponding items of identifying information may be compared. For example, it may be that one or both of the first identifying information and the second identifying information include a respective geolocation. Where both the first and second identifying information include such geographic information, determining that there is sufficient correspondence between the first and second computing devices may include finding a match between geolocations. For example, a location corresponding to a physical location of the first computing device 100 (such as may be included in the first identifying information) may be compared to a physical location of the second computing device 110 (such as may be included in the second identifying information) to determine whether the one geolocation is within a defined proximity to the other (e.g., that the first computing device 100 is sufficiently close to/within a defined range of the second computing device 110 and vice-versa).

However determined, if it is determined that there is a sufficient correspondence between the first identifying information and the second identifying information, an operation 420 is next.

If, however it is determined that there is not a sufficient correspondence between the first identifying information and the second identifying information, then an error condition is detected whereby the first computing device 100 will not be able to authenticate to the server computer system 130 using the second computing device 110. In some implementations, a corresponding error and/or failure indication may be sent by the server computer system 130 to the first computing device 100 (and/or to the second computing device 110) such as, for example, via the internetwork 140. For example, responsive to receiving such a failure indication, the first computing device 100 may present the failure to a user thereof such as, for example, via a display.

At the operation 418, responsive to having determined (at the operation 416) that there is sufficient correspondence between the first computing device 100 and the second computing device 110, an indication is sent to the second computing device 110. The indication is sent to request confirmation that the server computer system 130 should proceed with establishing a trusted session with the first computing device 100/authenticating the first computing device 100 to an account associated with the server computer system 130. Put another way, an indication is sent to the second computing device 110 requesting confirmation that the first computing device 100 should be authenticated to an account. The indication may be sent via the internetwork 140. For example, where the server computer system 130 is an instance of the example computing device 200, it may be that the indication is sent via the internetwork 140 using the communications module 240.

The indication that is sent may take a variety of forms and may include a variety of information. For example, the indication may include some or all of the identifying information for the first computing device 100. Indeed, as further described below, such identifying information may be provided to the second computing device 110 for use in determining whether a trusted session should be established between the first computing device 100 and the server computer system 130.

Responsive to receiving the indication, the second computing device 110 may determine whether or not a trusted session should be established between the first computing device 100 and the server computer system 130. For example, where the indication includes some or all of the identifying information for the first computing device 100, the second computing device 110 may employ some or all of that included information in making such a determination.

In some implementations, the second computing device 110 may present a user interface related to making the determination. For example, the second computing device 110 may prompt a user to select whether or not a trusted session should be established between the first computing device 100 and the server computer system 130. Such a prompt may be provided by way of a user interface providing a user with selectable options allowing selection of whether or not a trusted session should be established between the first computing device 100 and the server computer system 130. For example, where the second computing device 110 was identified based on particular software—i.e., a particular application/"app"—having been launched on the second computing device 110, the indication sent at the operation 420 may be handled by that application after it is received by the second computing device 110 and/or if a user interface is to be displayed responsive thereto, it may be displayed under the control of that application.

Figure 6:
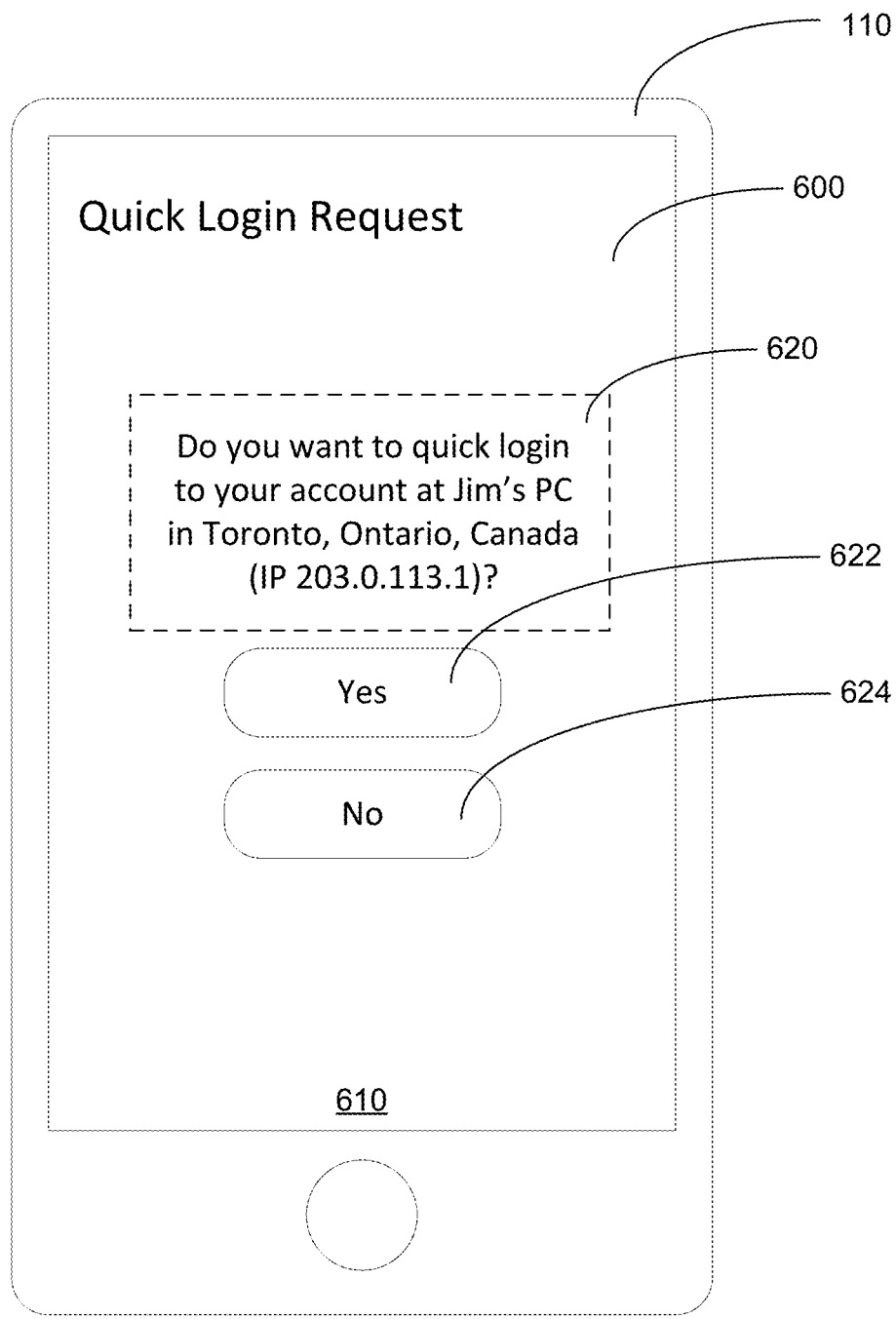
FIG. 6 shows an example user interface as may be displayed at a second computer system as a part of establishing a trusted session.

An example user interface 610 providing a user with such a set of selectable options allowing selection of whether or not a trusted session should be established between the first computing device 100 and the server computer system 130 is shown in FIG. 6. As illustrated, the example user interface 610 is displayed by the second computing device 110 and, in particular, using a display 600 of the second computing device 110. The example user interface 610 includes a prompt 620 asking the user whether the first computing device 100 should be permitted to authenticate to a particular account. Notably, the prompt 620 includes identifying information for the first computing device 100, namely a machine name/identifier for the first computing device 100 ("Jim's PC"), a location of the first computing device 100 (Toronto, Ontario, Canada), and an IP address of the first computing device 100 (203.0.113.1). A user of the second computing device 110 may review the example user interface 610 and may provide input selecting either a first option 622 to allow the first computing device 100 to authenticate to the account or a second option 624 to select against the first computing device 100 from authenticating to the account. For example, the user may select an option based on a review of the identifying information included in the prompt. The selection/input may be provided, for example, via the display 600 if it is a touch screen. Provided input may be received by the second computing device 110 via the I/O module 230 where the second computing device 110 is an instance of the example computing device 200. However received, responsive to receiving the input, the second computing device 110 may send a response to the second computing device 110 indicating whether or not the first computing device 100 should be authenticated. The second computing device 110 may send such an indication via the internetwork 140 such as, for example, using the communications module 240 where the second computing device 110 is an instance of the example computing device 200.

Notably, a user may be expected to respond in the affirmative (e.g., by selecting the first option 622) where the user intends to allow a login at the first computing device 100. For example, it could be that the second computing device 110 is a mobile device associated with that user and the user is attempting to login at the first computing device 100 while holding the second computing device 110 and/or while having it within reach and therefore fully intends to allow the first computing device 100 to establish a trusted session with the server computer system 130.

In some cases, it may be that a prompt for user input at the second computing device 110 goes without the second computing device 110 receiving input corresponding to a response within a reasonable time. This may, for example, occur if the second computing device 110 is lost or out of reach of the user. Accordingly, in some implementations, a prompt as to whether the authentication by the first computing device 100 should proceed may have an associated timeout and, if no input is received responsive thereto within a timeout period, then the second computing device 110 may default to sending some default response. For example, if the timeout occurs, the second computing device 110 may send a negative response to stop the authentication by the first computing device 100 from proceeding (and thus effectively failing in a "safe"/"secure-by-default" manner).

Returning to the discussion of FIG. 4 and operations performed by the server computer system 130 in carrying out the method 400, following the sending of the indication at the operation 420, an operation 422 is next.

At the operation 422, the server computer system 130 receives an indication as to whether or not the first computing device 100 should be allowed to authenticate (e.g., from the second computing device 110 as discussed above). Such an indication may be received via the internetwork 140 such as, for example, using the communications module where the server computer system 130 is an instance of the example computing device 200.

Responsive to the indication received at the operation 422, at the operation 424, the server computer system 130 determines whether the first computing device 100 should be authenticated to the server computer system 130. If the received indication indicates that the first computing device 100 should be authenticated, then an operation 426 is next. Put another way, if an indication confirming that the first computing device should be authenticated to the account/ allowed to establish a trusted session is received by the server computer system 130 at the operation 422, then control flow proceeds from the operation 424 to the operation 426. Alternatively, if the authentication indicates that the first computing device should not be allowed to proceed with authentication, an error condition has been detected and the first computing device 100 will be unable to authenticate to the server computer system 130 using the second computing device 110. Similar to the other error condition mentioned above, in some implementations, a corresponding error and/or failure indication may be sent by the server computer system 130 to the first computing device 100 (and/or to the second computing device 110) such as, for example, via the internetwork 140. For example, responsive to receiving such a failure indication, the first computing device 100 may present the failure to a user thereof such as, for example, via a display thereof.

At the operation 426, having received confirmation that the first computing device 100 should be permitted to authenticate, a trusted session between the first computing device 100 and the server computer system 130 is established. For example, the server computer system 130 may be authenticated to an account associated with the server computer system 130 as mentioned above. Establishing a trusted session may involve a variety of operations and may, for example, involve an authentication token being provided to the first computing device 100 by the server computer system 130 (e.g., via the internetwork 140).

The above is provided by way of example and is capable of variation without departing from the subject matter of the present application. Example variations will now be discussed.

As a first example of a possible variation, it may be that both the first computing device 100 and the second computing device 110 are employed in confirming that the first computing device 100 should be allowed to establish a trusted session with the server computer system 130 (e.g., responsive to the indication sent at the operation 420 above). For example, the server computer system 130 may generate an authentication code (e.g., a sequence of digits and/or characters—i.e., a passcode, perhaps of a defined length) responsive to determining that there is sufficient correspondence between the first computing device 100 and the second computing device 110 (at the operation 418) and prior to sending the indication to the second computing device 110 requesting confirmation that the first computing device 100 should be authenticated (at the operation 420). That code may then be sent (e.g., as a part of the indication sent at the operation 420) for presentation by the second computing device 110 and the code may then, once received by the second computing device 110, be presented by the second computing device 110 (e.g., by displaying a suitable user interface). The user may then be expected to enter that code at the first computing device 100—i.e., to provide a value purported to be that code as input to the first computing device 100 (e.g., such as may, for example, received, for example, using the I/O module 230 where the first computing device 100 is an instance of the example computing device 200). The first computing device 100 may then send an indication of the received input to the server computer system 130. The first computing device 100 may send the purported code as received to the server computer system 130 such as, for example, via the internetwork 140 (e.g., using the communications module 240 where the first computing device 100 is an instance of the example computing device 200). Put another way, the indication as to whether or not the first computing device should be authenticated that is received by the server computer system 130 at the operation 422 may correspond to an indication sent by the first computing device 100. In such a case, determining whether or not the first computing device should be authenticated at the operation 424 above may correspond to determining whether or not the purported code (as received by the second computing device 110 from the first computing device 100) matches the actual code (i.e., the code that was generated by the server computer system 130 and sent to the second computing device 110).

As a second example of a possible variation, it may be that in order to confirm that the first computing device 100 should be permitted to authenticate, the user is expected to authenticate to the second computing device 110. For example, the user may be required to authenticate using an authentication method provided by the second computing device 110 such as, for example, facial and/or fingerprint-based authentication. Notably, requiring authentication at the second computing device 110 may enhance security of the method 400. Furthermore, because the method 400 allows authentication steps such as may otherwise be required to authenticate at the first computing device 100 to be avoided (e.g., by avoiding the need to enter a credential at the first computing device 100), the user may be considered to, in effect, be authenticating at the first computing device 100 using an authentication method provided by the second computing device 110 that might not be available at the first computing device 100 when authenticating using it directly. For example, the subject matter of the present application may allow fingerprint authentication to be employed as a part of the overall process of authenticating the first computing device 100 to the server computer system 130 even though the first computing device 100 may not have a fingerprint sensor through use of a fingerprint sensor of the second computing device 110.

As another example of a possible variation, although in the above example the first computing device 100 is a personal computer and the second computing device 110 is a smart phone, the subject matter of the present application may be employed for authentication in association with other computing devices. For example, the first computing device 100 could be a smart speaker (such as, for example, the Amazon™ Echo™ or the Google™ Home™) that provides an interactive voice assistant that can respond to voice queries from users and undertake tasks responsive to such voice queries. A user requesting to login to such a smart speaker could then use the second computing device 110 (which could, for example, again be a smart phone or, alternatively, some other computing device such as, for example, a personal computer) to quickly login to the first computing device 100. Conveniently, in this way, providing a credential to the smart speaker may be avoided. Notably, this may provide a security advantage as other modes of authentication could be more reliant on a third-party to ensure security. For example, if voice recognition is employed to authenticate to the smart speaker, authentication may be reliant on the smart speaker provider and/or a server associated with that provider to provide that voice recognition securely. In another example, authentication with the server computer system 130 using a smart speaker through use of a password spoken to the smart speaker would generally mean that that credential would have to pass through the smart speaker provider as well (e.g., so that the smart speaker provider and/or a server associated therewith can perform speech recognition on the spoken password).

Notably, the subject matter of the present application may potentially be beneficially employed where a user typically interacts with a service provided by the server computer system 130 using the second computing device 110 but occasionally needs/desires to use the first computing device 100 to interact with the service. For example, in some cases, a desktop version of an application or website may have more features available than a corresponding mobile application or website. In such a case, the subject matter of the present application may allow a user using such a mobile application/website that wishes/needs to access a feature that is only available via the corresponding desktop site/application to easily transition to the desktop version by avoiding the need to perform a potentially burdensome conventional authentication procedure at the first computing device 100 through instead performing a "quick login" according to the subject matter of the present application.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
a processor;
a communications module coupled to the processor; and
a memory module coupled to the processor and storing instructions that, when executed by the processor, cause the computer system to:
receive, using the communications module from a first computing device via an internetwork, a request to authenticate to an account using a second computing device;
obtain first identifying information for the first computing device, the first identifying information including first network identifying information corresponding to a first network of the internetwork to which the first computing device is directly connected;

obtain second identifying information for the second computing device, the second identifying information including second network identifying information corresponding to a second network of the internetwork to which the second computing device is directly connected;

determine based on the first and second identifying information that there is sufficient correspondence between the first and second computing devices;

responsive to determining that there is sufficient correspondence between the first and second computing devices, send, using the communications module via the internetwork, an indication to the second computing device requesting confirmation that the first computing device should be authenticated to the account;

receive, using the communications module via the internetwork, an indication confirming that the first computing device should be authenticated to the account; and responsive to the indication, authenticate the first computing device to the account;

wherein the first identifying information includes multiple items for which there are corresponding items in the second identifying information and wherein confirming based on the first and second identifying information that there is sufficient correspondence between the first and second computing devices includes determining that there is a correspondence between at least a threshold number of the corresponding items.

2. The computer system of claim 1, wherein determining that there is a correspondence between at least a threshold number of the corresponding items includes determining that there is a correspondence between all of the corresponding items.

3. The computer system of claim 1, wherein the corresponding items include at least two of geolocations of the first and second computing devices, gateway servers associated with the first and second networks, network addresses associated with the first and second computing devices and service set identifiers of the first and second network.

4. The computer system of claim 1, wherein the first computing device includes a smart speaker.

5. A computer system comprising:

a processor;

a communications module coupled to the processor; and a memory module coupled to the processor and storing instructions that, when executed by the processor, cause the computer system to:

receive, using the communications module from a first computing device via an internetwork, a request to authenticate to an account using a second computing device;

obtain first identifying information for the first computing device, the first identifying information including first network identifying information corresponding to a first network of the internetwork to which the first computing device is directly connected, wherein the first network includes a wireless network and wherein the first network identifying information includes a service set identifier (SSID) of the first network;

obtain second identifying information for the second computing device, the second identifying information including second network identifying information corresponding to a second network of the internetwork to which the second computing device is directly connected, wherein the second network includes a wireless network and wherein the second network identifying information includes an SSID of the second network;

determine based on the first and second identifying information that there is sufficient correspondence between the first and second computing devices including determining that the SSID of the first network is the same as the SSID of the second network;

responsive to determining that there is sufficient correspondence between the first and second computing devices, send, using the communications module via the internetwork, an indication to the second computing device requesting confirmation that the first computing device should be authenticated to the account;

receive, using the communications module via the internetwork, an indication confirming that the first computing device should be authenticated to the account; and responsive to the indication, authenticate the first computing device to the account.

6. A computer system comprising:

a processor;

a communications module coupled to the processor; and a memory module coupled to the processor and storing instructions that, when executed by the processor, cause the computer system to:

receive, using the communications module from a first computing device via an internetwork, a request to authenticate to an account using a second computing device;

obtain first identifying information for the first computing device, the first identifying information including first network identifying information corresponding to a first network of the internetwork to which the first computing device is directly connected, wherein the first network identifying information includes an address of a first gateway server through which nodes on the first network access the internetwork;

obtain second identifying information for the second computing device, the second identifying information including second network identifying information corresponding to a second network of the internetwork to which the second computing device is directly connected, wherein the second network identifying information includes an address of a second gateway server through which nodes on the second network access the internetwork;

determine based on the first and second identifying information that there is sufficient correspondence between the first and second computing devices including determining based on the addresses that the first gateway server is the same as the second gateway server;

responsive to determining that there is sufficient correspondence between the first and second computing devices, send, using the communications module via the internetwork, an indication to the second computing device requesting confirmation that the first computing device should be authenticated to the account;

receive, using the communications module via the internetwork, an indication confirming that the first computing device should be authenticated to the account; and responsive to the indication, authenticate the first computing device to the account.

7. A computer system comprising:

a processor;

a communications module coupled to the processor; and a memory module coupled to the processor and storing instructions that, when executed by the processor, cause the computer system to:

receive, using the communications module from a first computing device via an internetwork, a request to authenticate to an account using a second computing device;

obtain first identifying information for the first computing device, the first identifying information including a first geolocation corresponding to a physical location of the first computing device;

obtain second identifying information for the second computing device, the second identifying information including a second geolocation corresponding to a physical location of the second computing device;

determine based on the first and second identifying information that there is sufficient correspondence between the first and second computing devices including determining that the first geolocation is within a defined proximity to the second geolocation;

responsive to determining that there is sufficient correspondence between the first and second computing devices, send, using the communications module via the internetwork, an indication to the second computing device requesting confirmation that the first computing device should be authenticated to the account;

receive, using the communications module via the internetwork, an indication confirming that the first computing device should be authenticated to the account; and responsive to the indication, authenticate the first computing device to the account.

8. A computer system comprising:

a processor;

a communications module coupled to the processor; and a memory module coupled to the processor and storing instructions that, when executed by the processor, cause the computer system to:

receive, using the communications module from a first computing device via an internetwork, a request to authenticate to an account using a second computing device;

obtain first identifying information for the first computing device, the first identifying information including first network identifying information corresponding to a first network of the internetwork to which the first computing device is directly connected, wherein the first identifying information includes a first Internet Protocol (IP) address associated with the first computing device on the first network;

obtain second identifying information for the second computing device, the second identifying information, the second identifying information including second network identifying information corresponding to a second network of the internetwork to which the second computing device is directly connected, wherein the second identifying information includes a second IP address associated with the second computing device on the second network;

determine based on the first and second identifying information that there is sufficient correspondence between the first and second computing devices including determining that the first IP address and the second IP address are on the same subnet;

responsive to determining that there is sufficient correspondence between the first and second computing devices, send, using the communications module via the internetwork, an indication to the second computing device requesting confirmation that the first computing device should be authenticated to the account;

receive, using the communications module via the internetwork, an indication confirming that the first computing device should be authenticated to the account; and responsive to the indication, authenticate the first computing device to the account.

9. A computer system comprising:

a processor;

a communications module coupled to the processor; and a memory module coupled to the processor and storing instructions that, when executed by the processor, cause the computer system to:

receive, using the communications module from a first computing device via an internetwork, a request to authenticate to an account using a second computing device;

obtain first identifying information for the first computing device, the first identifying information including first network identifying information corresponding to a first network of the internetwork to which the first computing device is directly connected;

obtain second identifying information for the second computing device, the second identifying information including second network identifying information corresponding to a second network of the internetwork to which the second computing device is directly connected;

determine based on the first and second identifying information that there is sufficient correspondence between the first and second computing devices;

responsive to determining that there is sufficient correspondence between the first and second computing devices, generate a code;

send, using the communications module via the internetwork, a first indication to the second computing device requesting confirmation that the first computing device should be authenticated to the account, wherein the first indication includes the code for presentation by the second computing device;

receive, using the communications module via the internetwork, a second indication, the second indication confirming that the first computing device should be authenticated to the account, wherein the second indication is received from the first computing device and includes a value purported to be the code; and responsive to the second indication, authenticate the first computing device to the account, wherein the first computing device is authenticated to the account responsive to determining that the value purported to be the code matches the code.

10. A computer-implemented method comprising:
receiving, from a first computing device via an internetwork, a request to authenticate to an account using a second computing device;
obtaining first identifying information for the first computing device, the first identifying information including first network identifying information corresponding to a first network of the internetwork to which the first computing device is directly connected;
obtaining second identifying information for the second computing device, the second identifying information including second network identifying information corresponding to a second network of the internetwork to which the second computing device is directly connected;
determining based on the first and second identifying information that there is sufficient correspondence between the first and second computing devices;
responsive to determining that there is sufficient correspondence between the first and second computing devices, sending, via the internetwork, an indication to the second computing device requesting confirmation that the first computing device should be authenticated to the account;
receiving, via the internetwork, an indication confirming that the first computing device should be authenticated to the account; and
responsive to the indication, authenticating the first computing device to the account;
wherein the first identifying information includes multiple items for which there are corresponding items in the second identifying information and wherein confirming based on the first and second identifying information that there is sufficient correspondence between the first and second computing devices includes determining that there is a correspondence between at least a threshold number of the corresponding items.

11. The method of claim 10, wherein determining that there is a correspondence between at least a threshold number of the corresponding items includes determining that there is a correspondence between all of the corresponding items.

12. The method of claim 10, wherein the corresponding items include at least two of geolocations of the first and second computing devices, gateway servers associated with the first and second networks, network addresses associated with the first and second computing devices and service set identifiers of the first and second network.

13. A computer-implemented method comprising:
receiving, from a first computing device via an internetwork, a request to authenticate to an account using a second computing device;
obtaining first identifying information for the first computing device, the first identifying information including first network identifying information corresponding to a first network of the internetwork to which the first computing device is directly connected, wherein the first network includes a wireless network and wherein the first network identifying information includes a service set identifier (SSID) of the first network,
obtaining second identifying information for the second computing device, the second identifying information including second network identifying information corresponding to a second network of the internetwork to which the second computing device is directly connected, wherein the second network includes a wireless network and wherein the second network identifying information includes an SSID of the second network,
determining based on the first and second identifying information that there is sufficient correspondence between the first and second computing devices, including determining that the SSID of the first network is the same as the SSID of the second network;
responsive to determining that there is sufficient correspondence between the first and second computing devices, sending, via the internetwork, an indication to the second computing device requesting confirmation that the first computing device should be authenticated to the account;
receiving, via the internetwork, an indication confirming that the first computing device should be authenticated to the account; and
responsive to the indication, authenticating the first computing device to the account.

14. A computer-implemented method comprising:
receiving, from a first computing device via an internetwork, a request to authenticate to an account using a second computing device;
obtaining first identifying information for the first computing device, the first identifying information including first network identifying information corresponding to a first network of the internetwork to which the first computing device is directly connected, wherein the first network identifying information includes an address of a first gateway server through which nodes on the first network access the internetwork;
obtaining second identifying information for the second computing device, the second identifying information including second network identifying information corresponding to a second network of the internetwork to which the second computing device is directly connected, wherein the second network identifying information includes an address of a second gateway server through which nodes on the second network access the internetwork;
determining based on the first and second identifying information that there is sufficient correspondence between the first and second computing devices including determining based on the addresses that the first gateway server is the same as the second gateway server;
responsive to determining that there is sufficient correspondence between the first and second computing devices, sending, via the internetwork, an indication to the second computing device requesting confirmation that the first computing device should be authenticated to the account;
receiving, via the internetwork, an indication confirming that the first computing device should be authenticated to the account; and
responsive to the indication, authenticating the first computing device to the account.

15. A computer-implemented method comprising:
receiving, from a first computing device via an internetwork, a request to authenticate to an account using a second computing device;
obtaining first identifying information for the first computing device, the first identifying information including first network identifying information corresponding to a first network of the internetwork to which the first computing device is directly connected including a first geolocation corresponding to a physical location of the first computing device;

obtaining second identifying information for the second computing device, the second identifying information including second network identifying information corresponding to a second network of the internetwork to which the second computing device is directly connected including a second geolocation corresponding to a physical location of the second computing device;

determining based on the first and second identifying information that there is sufficient correspondence between the first and second computing devices including determining that the first geolocation is within a defined proximity to the second geolocation;

responsive to determining that there is sufficient correspondence between the first and second computing devices, sending, via the internetwork, an indication to the second computing device requesting confirmation that the first computing device should be authenticated to the account;

receiving, via the internetwork, an indication confirming that the first computing device should be authenticated to the account; and responsive to the indication, authenticating the first computing device to the account.

16. A computer-implemented method comprising:

receiving, from a first computing device via an internetwork, a request to authenticate to an account using a second computing device;

obtaining first identifying information for the first computing device, the first identifying information including first network identifying information corresponding to a first network of the internetwork to which the first computing device is directly connected including a first Internet Protocol (IP) address associated with the first computing device on the first network;

obtaining second identifying information for the second computing device, the second identifying information including second network identifying information corresponding to a second network of the internetwork to which the second computing device is directly connected including a second IP address associated with the second computing device on the second network;

determining based on the first and second identifying information that there is sufficient correspondence between the first and second computing devices including determining that the first IP address and the second IP address are on the same subnet;

responsive to determining that there is sufficient correspondence between the first and second computing devices, sending, via the internetwork, an indication to the second computing device requesting confirmation that the first computing device should be authenticated to the account;

receiving, via the internetwork, an indication confirming that the first computing device should be authenticated to the account; and responsive to the indication, authenticating the first computing device to the account wherein the first identifying information includes multiple items for which there are corresponding items in the second identifying information and wherein confirming based on the first and second identifying information that there is sufficient correspondence between the first and second computing devices includes determining that there is a correspondence between at least a threshold number of the corresponding items.

17. A computer-implemented method comprising:

receiving, from a first computing device via an internetwork, a request to authenticate to an account using a second computing device;

obtaining first identifying information for the first computing device, the first identifying information including first network identifying information corresponding to a first network of the internetwork to which the first computing device is directly connected;

obtaining second identifying information for the second computing device, the second identifying information including second network identifying information corresponding to a second network of the internetwork to which the second computing device is directly connected;

determining based on the first and second identifying information that there is sufficient correspondence between the first and second computing devices;

responsive to determining that there is sufficient correspondence between the first and second computing devices, generating a code;

sending, via the internetwork, a first indication to the second computing device requesting confirmation that the first computing device should be authenticated to the account, wherein the first indication includes the code for presentation by the second computing device;

receiving, via the internetwork, a second indication, the second indication confirming that the first computing device should be authenticated to the account, wherein the second indication is received from the first computing device and includes a value purported to be the code; and responsive to the second indication, authenticate the first computing device to the account, wherein the first computing device is authenticated to the account responsive to determining that the value purported to be the code matches the code.

18. A non-transitory computer-readable storage medium storing instructions, that, when executed by a processor of a computer system, cause the computer system to:

receive, from a first computing device via an internetwork, a request to authenticate to an account using a second computing device;

obtain first identifying information for the first computing device, the first identifying information including first network identifying information corresponding to a first network of the internetwork to which the first computing device is directly connected;

obtain second identifying information for the second computing device, the second identifying information including second network identifying information corresponding to a second network of the internetwork to which the second computing device is directly connected;

determine based on the first and second identifying information that there is sufficient correspondence between the first and second computing devices;

responsive to determining that there is sufficient correspondence between the first and second computing devices, send, via the internetwork, an indication to the second computing device requesting confirmation that the first computing device should be authenticated to the account;

receive, via the internetwork, an indication confirming that the first computing device should be authenticated to the account; and responsive to the indication, authenticate the first computing device to the account;

wherein the first identifying information includes multiple items for which there are corresponding items in the second identifying information and wherein confirming based on the first and second identifying information that there is sufficient correspondence between the first and second computing devices includes determining that there is a correspondence between at least a threshold number of the corresponding items.

\* \* \* \* \*